United States Patent [19]

Bowden

[11] 4,010,023
[45] Mar. 1, 1977

[54] MANUFACTURE OF ALUMINA FOR USE IN THE BASIC OXYGEN FURNACE

[76] Inventor: James J. Bowden, P.O. Box 127, Cortland, Ohio 44410

[22] Filed: July 2, 1975

[21] Appl. No.: 592,393

[52] U.S. Cl. .................................. 75/3; 75/24; 75/53; 75/68 R
[51] Int. Cl.² .................. C22B 1/08; C21C 7/00
[58] Field of Search ............... 75/53, 58, 52, 68, 3, 75/24; 423/600

[56] References Cited

UNITED STATES PATENTS

| | | | |
|---|---|---|---|
| 2,927,852 | 3/1960 | Bowden | 75/53 |
| 3,318,687 | 5/1967 | Bowden | 75/53 |
| 3,320,052 | 5/1967 | Bowden | 75/53 |

*Primary Examiner*—Peter D. Rosenberg
*Attorney, Agent, or Firm*—Michael Williams

[57] ABSTRACT

In the method of making steel in the BOF furnace the use of a slag-forming agent which heretofore was considered a waste product resulting from a scrap-aluminum melting operation.

5 Claims, 4 Drawing Figures

Fig. 1. FLUORSPAR REACTIONS

| | |
|---|---|
| 1 | $\overset{1300}{FeO MnO SiO_2} + \overset{2570}{2CaO} \rightarrow \overset{2130}{2CaO SiO_2} + \overset{1785}{MnO} + \overset{1380}{FeO}$ |
| 2 | $\overset{2130}{2CaO SiO_2} + \overset{1386}{CaF_2} + \overset{1590}{Fe_2O_3} \rightarrow \overset{1436}{2CaO Fe_2O_3} + \overset{GAS}{SiF_4} + \overset{2570}{2CaO}$    With CaO now in solution |
| 3 | $\overset{1436}{2CaO Fe_2O_3} + \overset{1600}{Fe} \rightarrow \overset{2570}{2CaO} + \overset{1380}{3FeO} \rightarrow CaO$ now in solution |
| 4 | $\overset{1380}{FeO} + \overset{1300}{Fe_3C} \rightarrow \overset{1600}{4Fe} + \overset{GAS}{CO}$ — Foam + Slopping |

Fig. 2. ALUMINA REACTIONS

| | |
|---|---|
| 1 | $\overset{1300}{FeO MnO SiO_2} + \overset{2570}{2CaO} \rightarrow \overset{2130}{2CaO SiO_2} + \overset{1785}{MnO} + \overset{1380}{FeO}$ |
| 2 | $\overset{2130}{2CaO Al_2O_3} + \overset{2050}{Al_2O_3} \rightarrow \overset{1590}{2CaO Al_2O_3 SiO_2}$ |
| 3 | $\overset{1590}{2CaO Al_2O_3 SiO_2} + \overset{2570}{CaO} \rightarrow \overset{2130}{2CaO SiO_2} + \overset{1500}{CaO Al_2O_3}$ |
| 4 | $\overset{1500}{CaO Al_2O_3} + \overset{1590}{Fe_2O_3} + \overset{2570}{3CaO} \rightarrow \overset{1415}{4CaO Al_2O_3 Fe_2O_3}$ |
| 5 | $\overset{1415}{4CaO Al_2O_3 Fe_2O_3} + \overset{2570}{CaO} \rightarrow \overset{1395}{4CaO Al_2O_3 Fe_2O_3}$ |

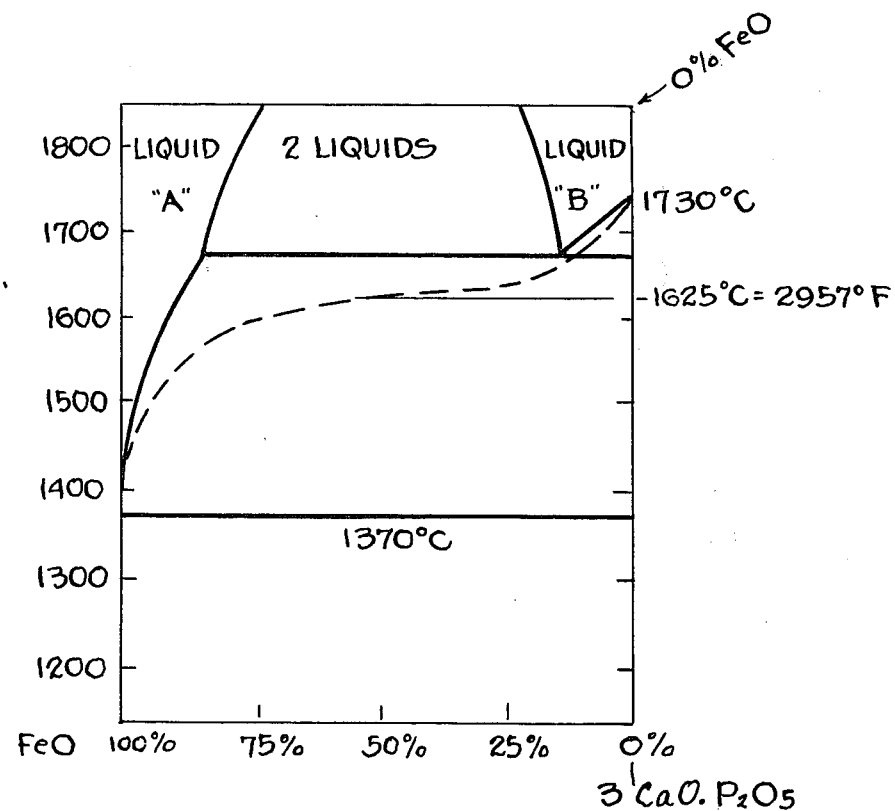

Fig. 4.

MANUFACTURE OF ALUMINA FOR USE IN THE BASIC OXYGEN FURNACE

BACKGROUND AND SUMMARY

The making of steel by the BOF furnace has increased considerably in recent years because of the high efficiency of this method, and therefore the lower cost of manufacture. In the BOF method, iron scrap, pig iron and lime are charged into the furnace, and an oxygen flame jets down on the charge. Lime is a major constitutent of steel making slags, but has an extremely high melting point (4568° F) and it is impractical to raise the furnace temperature to the melting point of lime. To reduce the temperature necessary to fuse the lime, other agents were added to the furnace charge. One agent used almost exclusively in the BOF furnnace is fluorspar, and it has performed very well in its combination with lime.

However, good grade fluorspar has in recent years been in dwindling supply and therefore expensive. The main source of fluorspar is located in Mexico and importation not only represents transportation expense but also adversely affects the national balance of trade payments. The readily available supply of fluorspar is of poor quality and as a consequence steelmakers have been conducting extensive research to find a suitable fluorspar substitute. The search for inexpensive slag fluidizers still continues with the steelmakers.

In the melting of scrap aluminum, in which I am engaged, to produced relatively pure aluminum for use in steel making, the slag at the top of the molten aluminum is skimmed and thrown on a waste pile. Periodically this waste has to be hauled away to a dumping area, and this not only represented hauling expense but also affected the ecology because dumping areas are unsightly. Therefore, utilization of this waste produce not only creates a good source of a fluorspar substitute, but also provides such substitute at tremendous savings.

My invention proposes use of this waste product for combination with the lime in the furnace to lower the fluidizing temperature of the lime, and this waste product, being largely alumina, will perform in an acceptable manner.

DESCRIPTION OF THE DRAWINGS

The drawings which accompany this description and form part of this application, consist of FIGS. 1 through 4, which show chemical reactions in the making of steel by use of fluorspar and alumina, and these drawings are presented in order to better understand the utility of my invention.

DESCRIPTION OF THE PREFERRED EMBODIMENT

Figure 3:
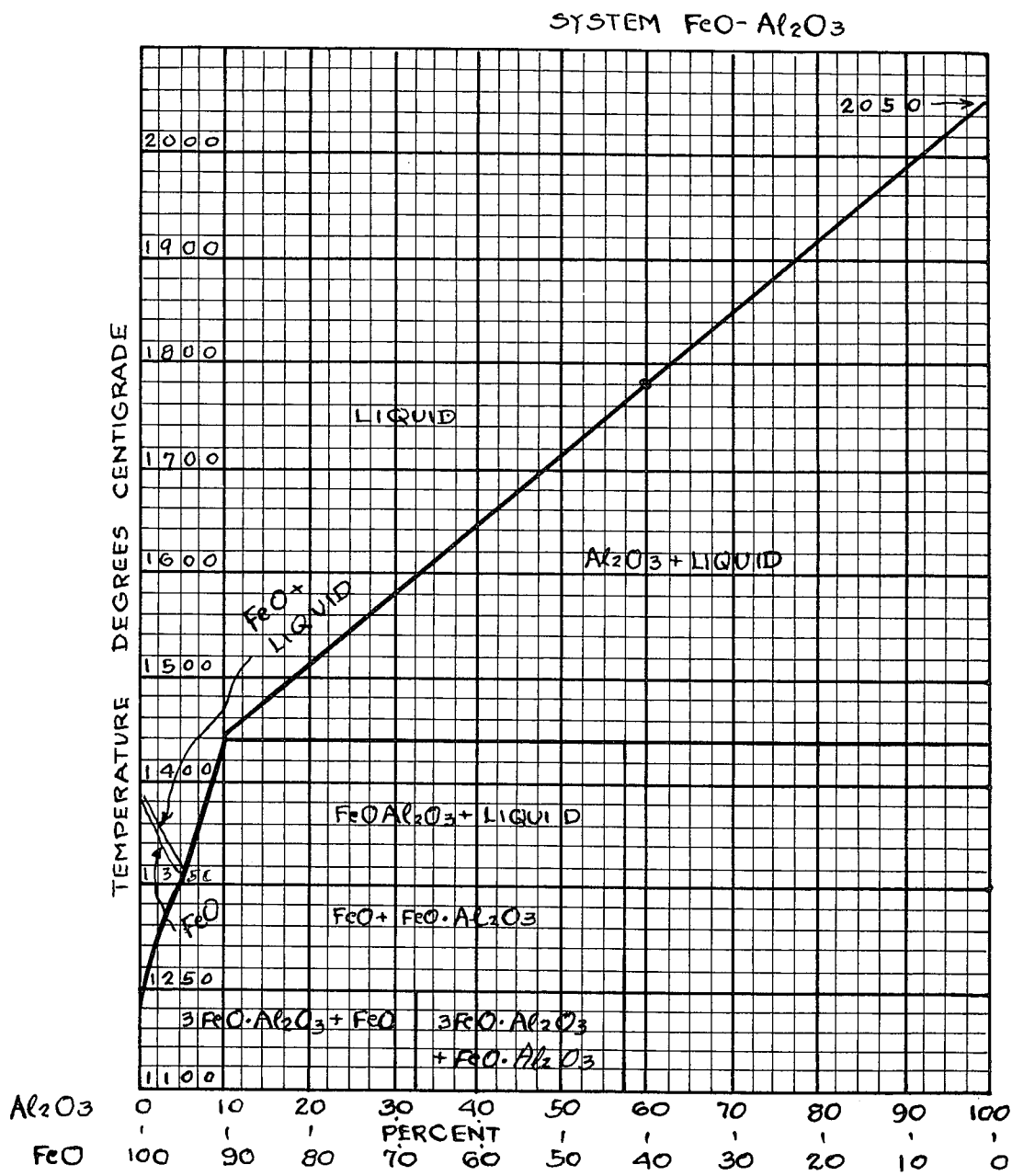

In an aluminum melting process the top part of the molten aluminum which is exposed to the air oxidizes and forms the major part of the fluid aluminum slag. This slag is skimmed off periodically and desposited on a waste pile for subsequent hauling to a dump area.

I have discovered that this waste product has valuable properties and therefore should not be discarded. The cooled slag, which is in clinker form, is subjected to an agitating operation, such as in a ball mill, where some of the aluminum is knocked loose. In the ball mill, the agitated product is then screened through a screen of suitable mesh. The aluminum of larger particle size remains on top of the screen and may be collected for subsequent remelting. What goes through the screen is a powdery product which is largely alumina.

Alumina is an excellent substitute for fluorspar in the BOF steel-making process and although alumina may be mined, as bauxite, its use was limited because its expense approached that of fluorspar. However, by reason of my discovery, a very low cost source of alumina is now available to substitute for fluorspar.

In the BOF process an oxygen lance is inserted through the top of the furnace and an oxygen flame under pressure of about 125 pounds per square inch is blown on top of the furnace charge. This high pressure would blow out a lot of the powdered alumina and therefore the melting point of the lime would not be lowered.

In accordance with my invention, the powered aluminum slag is pelletized in a pelletizer. A suitable binder may be mixed with the powdered alumina so that the pellets are form-retaining. Any suitable binder may be used such, for example, bentonite, aluminum silicate, etc. The pellets should preferably have a size approximately equal to a one-half inch diameter ball, so as to have sufficient density to resist being blown out of the furnace bythe high pressure oxygen flame.

It is a well known fact that lower carbon steels result in lower phosphorous finished content in the steel bath which is brought about by the higher state of oxidation in the slag that accompanies lower carbon steel. This is because the ferrous oxide combines with the tricalcium phosphate.

The normal composition of steel contains among other things, iron, carbon manganese, phosphorous and silicon. Phosphorous in most instances is deleterious to steel quality, and in steels having relatively low carbon content it is possible to get lower phosphorous content in the steel principally because such steels in their manufacture generate ferrous oxide in the slag. As the carbon in the steel increases the ferrous oxide is not developed which causes the phosphorous to remain in the steel bath. However, by increasing the concentration of ferrous oxide the combination of tricalcium phosphate and ferrous oxide permits the lowering of the phosphorous content in the steel bath.

In the steel refining process, the removal of phosphorous which is present in the steel bath is accomplished by the formation of tricalcium phosphate, but this mineral, having a melting point of 1730° C, is not formed at the temperature that occurs in the steel melting operation. However, by the addition of ferrous oxide to the system as shown in FIG. 3, the melting point of the mixture of tricalcium phosphate and ferrous oxide causes a lowering of the melting point until at 60% ferrous oxide and 40% alumina the melting point of the combination is within range of the temperature found in the melting of steel.

With reference to FIG. 1, it will be noted that the second step in the fluorspar reaction produces silicon fluoride (SiF4) which is a highly toxic gas that goes to the atmosphere and forms a very dangerous polutant. It will be noted that no such gas is produced in the alumina reaction, shown in FIG. 2.

When aluminum oxide is used as a flux (see FIG. 2), no ferrous oxide is produced and in adition because of the absence of ferrous oxide in the fluxing reaction (alumina reaction) it is not possible to lower the carbon; hence, ferrous oxide must be added to the alumina flux to secure the lower melting point mixture.

FIG. 4 shows how the alumina combines with the ferrous oxide, in a preferred proportion of 40% of the former and 60% of the latter, to lower the melting point of the alumina to a degree well within the temperature carried on in steel-making practice.

As is shown in FIG. 2, alumina has a melting point of 2050° C and when combined with lime (CaO) a chain reaction occurs wherein brownmillerite ($4CaOAl_2O_3 \cdot Fe_2O_3$) is formed having a melting point of 1415° C which is well within the temperature met in the steel melting process. This chain reaction is promoted by the addition of an excess of FeO with the alumina.

I have discovered that a mixture of alumina, (such as the waste product hereinbefore described) and iron oxide, will not only fluidize the lime at a lower and acceptable temperature, but will also make possible the formation of slags that will pick up metallic phosphorouses from the underlying metal and transfer it to the slag where it will be present as tri calcium phosphate ($3CaOP_2O_5$) and no longer be harmful to the finished steel.

A mixture of about 40% alumina and 60% iron oxide is suitable for this reaction, which mixture may have a melting point approximating that obtained in the steel-melting process that can be charged into the BOF process with highly desirable results. This mixture is also preferably pelletized, to prevent it from being blown out of the furnace by the oxygen blast.

I claim:

1. The method of producing low-cost alumina for use as a flux in the manufacture of steel in a steel-making furnace, comprising:
   skimming the slag from the top of a melt of scrap aluminum,
   permitting the skimmed slag to solidify,
   subjecting the solidified slag to an agitating operation to remove at least some of the large particles of aluminum therefrom for remelting and for reducing the remainder of the solidified slag to particle and powdery form, and
   screening the remainder of the agitated slag to separate the particle form from the powdery form the latter being adapted for use in the steel-making furnace.

2. The method according to claim 1 and further mixing a powdery iron oxide with said powdery form.

3. The method according to claim 1 and further including the step of forming said powdery form into pellets.

4. The method according to claim 2 wherein said powdery form and said iron oxide are mixed in the proportion of about 40% of said powdery form and 60% of iron oxide.

5. The method according to claim 4 and further including the step of pelletizing said mixture.

* * * * *